US006993911B2

(12) United States Patent
Geijsel et al.

(10) Patent No.: US 6,993,911 B2
(45) Date of Patent: Feb. 7, 2006

(54) SYSTEM FOR POWER GENERATION IN A PROCESS PRODUCING HYDROCARBONS

(75) Inventors: Joannes Ignatius Geijsel, The Hague (NL); Martijn De Heer, Ellesmere (NL); Koen Willem De Leeuw, Amsterdam (NL); Jan Volkert Zander, Sarawak (MY)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/491,701

(22) PCT Filed: Oct. 4, 2002

(86) PCT No.: PCT/EP02/11139

§ 371 (c)(1),
(2), (4) Date: Apr. 2, 2004

(87) PCT Pub. No.: WO03/031327

PCT Pub. Date: Apr. 17, 2003

(65) Prior Publication Data

US 2004/0244377 A1 Dec. 9, 2004

(30) Foreign Application Priority Data

Oct. 5, 2001 (EP) .................................. 01308527

(51) Int. Cl.
*F01K 25/08* (2006.01)

(52) U.S. Cl. ............................ 60/651; 60/653; 60/671

(58) Field of Classification Search .................. 60/645, 60/651, 653, 671
See application file for complete search history.

(56) References Cited

U.S. PATENT DOCUMENTS 3,922,148 A 11/1975 Child .......................... 48/197
4,235,044 A 11/1980 Cheung ....................... 48/197
4,258,006 A 3/1981 Flockenhaus et al. ....... 422/146
4,799,356 A * 1/1989 Doering ....................... 60/648
4,833,170 A 5/1989 Agee .......................... 518/703
5,076,837 A * 12/1991 Rathbone et al. ............. 75/433
5,733,941 A 3/1998 Waycuilis ................... 518/703
5,937,652 A * 8/1999 Abdelmalek ................. 60/648
6,172,124 B1 1/2001 Wolflick et al. ............ 518/705
6,237,339 B1 * 5/2001 .ANG.sen et al. ............ 60/649

FOREIGN PATENT DOCUMENTS

| | | |
|---|---|---|
| EP | 0930268 | 7/1999 |
| EP | 1004561 | 5/2000 |
| EP | 1004746 | 5/2000 |
| EP | 1156026 | 11/2001 |
| JP | 57014685 | 1/1982 |
| WO | 91/15446 | 10/1991 |
| WO | 93/06041 | 4/1993 |
| WO | 94/21512 | 9/1994 |
| WO | 97/12118 | 4/1997 |

OTHER PUBLICATIONS

International Search Report mailed Jan. 14, 2003.
C.J. Kuhre, et al., "Partial Oxidation Grows Stronger in U.S.", Oil and Gas Journal, vol. 69, No. 36, Sep. 6, 1971, pp. 86-90.

* cited by examiner

*Primary Examiner*—Hoang Nguyen

(57) ABSTRACT

The invention relates to a system for power generation in a process for producing hydrocarbons by catalytic conversion of synthesis gas, involving:
i. an oxidation unit for producing synthesis gas and oxidation unit steam by partial oxidation of a hydro-carbonaceous feed and oxygen containing gas;
ii. a conversion unit for producing said hydrocarbons and conversion unit steam by catalytical conversion of said synthesis gas; and
iii. means for super heating conversion unit steam and a unit for power generation using the super heated steam.

26 Claims, 5 Drawing Sheets

SYSTEM FOR POWER GENERATION IN A PROCESS PRODUCING HYDROCARBONS

FIELD of the INVENTION

The present invention relates to a process for power generation in a process for producing hydrocarbons. These hydrocarbons have been produced by a catalytic conversion of synthesis gas. During normal operation this process produces a high amount of energy. The system according to the present invention relates to a system in which the surplus of produced energy is used for power generation.

BACKGROUND OF THE INVENTION

Many documents are known describing processes for the conversion of (gaseous) hydrocarbonaceous feedstocks, especially methane, natural gas and/or associated gas, into liquid products, especially methanol and liquid hydrocarbons, particularly paraffinic hydrocarbons. In this respect often reference is made to remote locations and/or off-shore locations, where no direct use of the gas is possible. Transportation of the gas, e.g. through a pipeline or in the form of liquefied natural gas, requires extremely high capital expenditure or is simply not practical, especially in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution.

In WO 94/21512 a process for the production of methanol has been described from an off-shore natural gas field using a floating platform. However, no integrated, efficient, low-cost process scheme has been described.

In WO 97/12118 a method and system for the treatment of a well stream from an off-shore oil and gas field has been described. Natural gas is converted into syngas using pure oxygen in an autothermal reformer, a combination of partial oxidation and adiabatic steam reforming. The syngas (comprising a considerable amount of carbon dioxide) is converted into liquid hydrocarbons and wax. No fully integrated process scheme for a highly efficient, low capital process is described in this document.

In WO 91/15446 a process is described to convert natural gas, particularly remote location natural gas (including associated gas), in the form of normally liquid hydrocarbons suitable for fuel use via methanol/dimethyl ether. However, no integrated, efficient, low-cost process scheme has been described.

In U.S. Pat. No. 4,833,170 a process is described for the production of heavier hydrocarbons from one or more gaseous light hydrocarbons. The light hydrocarbons are converted into syngas by autothermal reforming with air in the presence of recycled carbon dioxide and steam. However, no (energy) integrated, efficient, low-cost process scheme has been described.

Further schemes are described in EP 98204025.5 and EP 98204026.3.

SUMMARY OF THE INVENTION

The present invention is directed to a system for power generation in a process for producing hydrocarbons by catalytic conversion of synthesis gas, comprising:

i. an oxidation unit for producing synthesis gas and oxidation unit steam by partial oxidation of a hydro-carbonaceous feed and oxygen comprising gas;

ii. a conversion unit for producing said hydrocarbons and conversion unit steam by catalytical conversion of said synthesis gas; and iii. means for super heating conversion unit steam and a unit for power generation using the super heated steam.

The present invention provides a system for additional power generation and, preferably, export by optimization and enlargement of the steam cycles used in a process for producing hydrocarbons by catalytic conversion of synthesis gas. Steam produced in the unit operations, may be used for the power generation. One of the unit operations is the oxidation unit for producing synthesis gas by oxidation of a hydro-carbonaceous feed and oxygen comprising gas. The syngas produced is cooled from about 1100–1400° C. to about 200–500° C. and this cooling generates oxidation unit steam. A second unit operation is the conversion unit for producing hydrocarbons by catalytical conversion of the synthesis gas formed in the oxidation unit. Optionally, use could be made of heat and/or steam produced in an optional reformer unit in which synthesis gas is produced having a higher hydrogen/carbon monoxide ratio.

The various unit operations mentioned above produce steam of different types. According to the invention these different types of steam are used such that the overall thermal efficiency of the process is optimized as desired.

The present invention provides a system for power generation and power export in the afore mentioned process for producing hydrocarbons by catalytic conversion of synthesis gas which results in an improvement of the overall thermal efficiency of the process. Further power generation and export is feasable by super heating steam produced in the conversion unit and using this super heated steam from the conversion unit for generation of power to be exported.

BRIEF DESCRIPTION OF DRAWINGS

FIG. 1 shows system 1 according to the invention.

FIG. 2 shows a similar system 2 for generating power.

FIG. 3 shows a system 3 according to the invention for power generation.

FIG. 4 shows a system 4 according to the invention.

FIG. 5 shows a system 5 according to the invention for power generation.

DETAILED DESCRIPTION OF THE INVENTION

Figure 1:
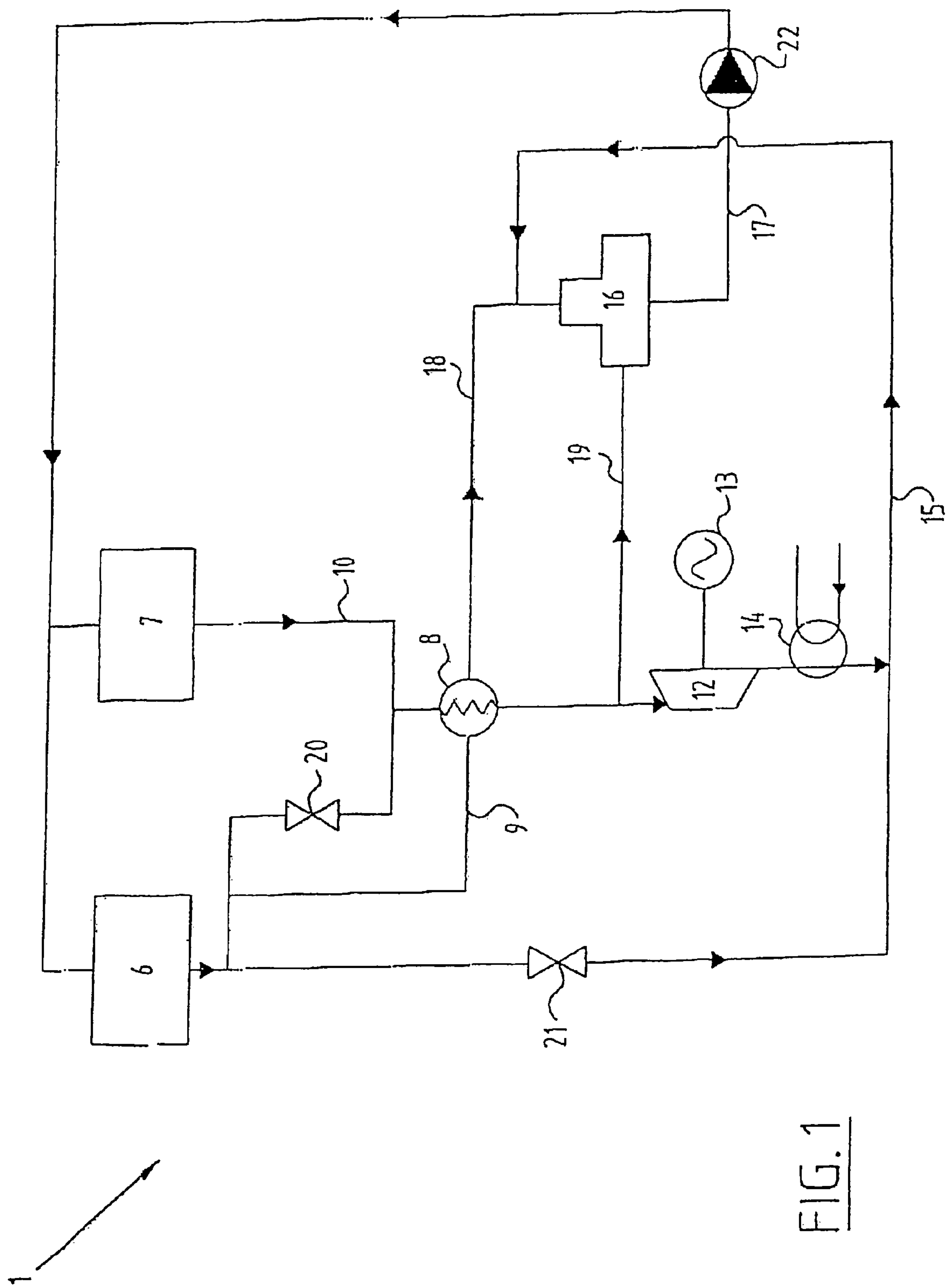
FIGS. 1–5 are flow sheets of the steam/water cycles of the systems according to the invention.

By super heating the saturated middle pressure steam from the conversion unit, additional power may be generated and available for export. Steam turbines driving compressors will provide the shaft power, which may be used for generating electricity via generators.

According to a first embodiment according to the present invention the super heating of the conversion unit steam may be carried out with flue gas. Any flue gas may be used. According to a first embodiment use is made of flue gas formed in a reformer unit in which hydrocarbonaceous feed is reformed into synthesis gas for use in the conversion unit. In a second embodiment the flue gas from a furnace, such as a dedicated furnace, fired with a hydrocarbonaceous feed. According to another embodiment of the present invention the conversion unit steam may be super heated using steam produced in the oxidation unit. This oxidation unit steam may be saturated and of high pressure. In another embodiment of the present invention flue gas and oxidation unit steam may both be used for super heating the conversion unit steam.

An additional generation of power is possible if (partly) oxidation unit steam is used for power generation. In such a situation it is preferred if, after power generations the oxidation unit steam (now of lower or middle pressure) is subsequently superheated. For this super heating, reformer unit flue gas may be used and/or oxidation unit steam. It is preferred if the oxidation unit steam used for power generation is super heated using the super heating means for super heating conversion unit steam.

In another embodiment, further power is generated and available for export if reformer unit steam is also used for power generation. In this situation it is further preferred if the reformer unit steam used for power generation is super heated using the steam super heating means for super heating conversion unit steam.

The hydrocarbonaceous feed may suitably be is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 75 percent, more preferably 90 percent. Very suitably natural gas or associated gas is used. Suitably, any sulphur in the feedstock is removed.

The (normally liquid) hydrocarbons produced in the process and mentioned in the present description may suitably be $C_{3-100}$ hydrocarbons, more suitably $C_{4-60}$ hydrocarbons, especially $C_{5-40}$ hydrocarbons, more especially, after hydrocracking, $C_{6-20}$ hydrocarbons, or mixtures thereof. These hydrocarbons or mixtures thereof are liquid at temperatures between 5 and 30° C. (1 bar), especially at 20° C. (1 bar), and usually are paraffinic of nature, while up to 20 wt %, preferably up to 5 wt %, of either olefines or oxygenated compounds may be present.

The partial oxidation of gaseous feedstocks, producing mixtures of especially carbon monoxide and hydrogen, may take place in the oxidation unit according to various established processes. These processes include the Shell Gasification Process. A comprehensive survey of this process can be found in the Oil and Gas Journal, Sep. 6, 1971, pp 86–90. Catalytic partial oxidation is another possibility.

The oxygen containing gas may be air (containing about 21 percent of oxygen), or oxygen enriched air, suitably containing up to 100 percent of oxygen, preferably containing at least 60 volume percent oxygen, more preferably at least 80 volume percent, more preferably at least 98 volume percent of oxygen. Oxygen enriched air may be produced via cryogenic techniques, but is preferably produced by a membrane based process, e.g. the process as described in WO 93/06041.

To adjust the $H_2/CO$ ratio in the syngas, carbon dioxide and/or steam may be introduced into the partial oxidation process. Preferably up to 15% volume based on the amount of syngas, more preferably up to 8% volume, even more preferably up to 4% volume, of either carbon dioxide or steam is added to the feed. As a suitable steam source, water produced in the hydrocarbon synthesis may be used. As a suitable carbon dioxide source, carbon dioxide from the effluent gasses of the expanding/combustion step may be used. The $H_2/CO$ ratio of the syngas is may suitably be between 1.5 and 2.3, preferably between 1.8 and 2.1. If desired, (small) additional amounts of hydrogen may be made by steam methane reforming, preferably in combination with the water shift reaction. Any carbon monoxide and carbon dioxide produced together with the hydrogen may be used in the hydrocarbon synthesis reaction or recycled to increase the carbon efficiency.

The percentage of hydrocarbonaceous feed which is converted in the first step of the process of the invention is suitably 50–99% by weight and preferably 80–98% by weight, more preferably 85–96% by weight.

The gaseous mixture, comprising predominantly hydrogen carbon monoxide and optionally nitrogen, is contacted with a suitable catalyst in the catalytic conversion stage, in which the normally liquid hydrocarbons are formed. Suitably at least 70 v/v % of the syngas is contacted with the catalyst, preferably at least 80%, more preferably at least 90, still more preferably all the syngas.

The catalysts used in the conversion unit for the catalytic conversion of the mixture comprising hydrogen and carbon monoxide into hydrocarbons are known in the art and are usually referred to as Fischer-Tropsch catalysts. Catalysts for use in the Fischer-Tropsch hydrocarbon synthesis process frequently comprise, as the catalytically active component, a metal from Group VIII of the Periodic Table of Elements. Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica and titania.

The amount of catalytically active metal on the carrier is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Particularly preferred metal oxide promoters for the catalyst used in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier.

The catalytically active metal and the promoter, if present, may be deposited on the carrier material by any suitable treatment, such as impregnation, kneading and extrusion. After deposition of the metal and, if appropriate, the promoter on the carrier material, the loaded carrier may typically be subjected to calcination at a temperature of generally from 350° C. to 750° C., preferably a temperature in the range of from 450° C. to 550° C. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200° C. to 350° C.

The catalytic conversion process may be performed in the conversion unit under conventional synthesis conditions known in the art. Typically, the catalytic conversion may be effected at a temperature in the range of from 100° C. to 600° C., preferably from 150° C. to 350° C., more preferably from 180° C. to 270° C. Typical total pressures for the catalytic conversion process are in the range of from 1 to 200 bar absolute, more preferably from 10 to 70 bar absolute. In the catalytic conversion process mainly (at least 70 wt %, preferably 80 wt %) $C_5^+$ hydrocarbons are formed.

Preferably, a Fischer-Tropsch catalyst is used, which yields substantial quantities of paraffins, more preferably substantially unbranched paraffins. A part may boil above the boiling point range of the so-called middle distillates. A most suitable catalyst for this purpose is a cobalt-containing Fischer-Tropsch catalyst. The term “middle distillates”, as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150° C. to about 360° C.

The higher boiling range paraffinic hydrocarbons, if present, may be isolated and subjected, in an optional hydrocracking unit, to a catalytic hydrocracking is to yield the desired middle distillates. The catalytic hydrocracking is carried out by contacting the paraffinic hydrocarbons at elevated temperature and pressure and in the presence of hydrogen with a catalyst containing one or more metals having hydrogenation activity, which is supported on a carrier. Suitable hydrocracking catalysts include catalysts comprising metals selected from Groups VIB and VIII of the Periodic Table of Elements. Preferably, the hydrocracking catalysts contain one or more noble metals from group VIII. Preferred noble metals are platinum, palladium, rhodium, ruthenium, iridium and osmium. Most preferred catalysts for use in the hydrocracking stage are those comprising platinum.

The amount of catalytically active metal present in the hydrocracking catalyst may vary within wide limits and is typically in the range of from about 0.05 to about 0.5 parts by weight per 100 parts by weight of the carrier material.

Suitable conditions for the optional catalytic hydrocracking in a hydrocracking unit are known in the art. Typically, the hydrocracking is effected at a temperature in the range of from about 175° C. to 400° C. Typical hydrogen partial pressures applied in the hydrocracking process are in the range of from 10 bar to 250 bar.

The process may conveniently and advantageously be operated in a recycle mode or in a single pass mode (“once through”) devoid of any recycle streams. This single pass mode allows the process to be comparatively simple and relatively low cost.

Each unit operation, that is, oxidation unit, conversion unit, reformer unit and hydrocracking unit, may comprise one or more reactors, either parallel or in series. In the case of small hydro-carbonaceous feedstock streams, the preference will be to use only one reactor in a unit operation. Slurry bed reactors, ebulliating bed reactors and fixed bed reactors may be used, the fixed bed reactor being the preferred option.

The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5–30° C. (1 bar), especially at 20° C. (1 bar). Further, oxygenated compounds, e.g. methanol, dimethylether, may be present in the off gas. The off gas may be utilized for the production of electrical power, in an expanding/combustion process. The energy generated in the process may be used for own use or for export to local customers. Part of the energy could may be used for the compression of the oxygen containing gas.

The process as just described may be combined with all possible embodiments as described in this specification.

In the process of the invention, hydrogen may be separated from the synthesis gas obtained in the first step. The hydrogen is preferably separated after quenching/cooling and may be separated by techniques known in the art, as pressure swing adsorption, or, preferably, by means of membrane separation techniques. The hydrogen may be used in a second heavy paraffin synthesis step after the first reactor (provided that a two stage hydrocarbon synthesis is used), or for other purposes, e.g. hydrotreating and/or hydrocracking of hydrocarbons produced in the paraffin synthesis. In this way, a further product optimization is obtained (for instance by fine tuning the $H_2$/CO ratio's in the first and second hydrocarbon synthesis step), while also the carbon efficiency may be improved. In addition, the product quality may be improved by e.g. hydrogenation and/or hydrocracking.

Any percentage mentioned in this description is calculated on total weight or volume of the composition, unless indicated differently. When not mentioned, percentages are considered to be weight percentages. Pressures are indicated in bar absolute, unless indicated differently.

Hereafter the system for power generation and export according to the invention will be further illustrated with reference to various embodiments which are provided for illustrative purposes without the intention for limiting the invention to those given embodiments. In these embodiments only the steam/water cycle of the systems according to the invention are shown.

FIG. 1 shows a system 1 according to the invention comprising an oxidation unit 6 in which a hydro-carbonaceous feed is partially oxidized using oxygen comprising gas resulting in the production of syngas and oxidation unit steam. This oxidation unit steam is high-pressure steam (50–70 bar/220–300° C.). The system 1 further comprises a conversion unit 7 for producing the hydrocarbons by catalytical conversion of the synthesis gas produced in oxidation unit 6 resulting also in the production of conversion unit steam which is saturated middle pressure steam (10–30 bar/200–270° C.).

The system 1 comprises means for super heating in the form of a super heater 8. In the super heater 8 oxidation unit steam supplied via line 9 is used for super heating conversion steam supplied via line 10. The super heated conversion steam is supplied via line 11 to a power generation unit 12 which may be coupled with a generator 13 for generating electricity. The expanded steam is cooled in a cooler 14 and the condensate formed is transported via line 15 to a degasser 16. Degassed water is supplied via line 17 to the oxidation unit 6 and the conversion unit 7.

The power generating unit 12 comprises steam turbines for producing shaft power and electricity required for use in operating the various operation units, such the oxidation unit 6 and the conversion unit 7.

The oxidation steam, after use being used for super heating the conversion unit steam, is transported via line 18 to the degasser 16. Any surplus of super heated conversion unit steam is transported via line 19 to the degasser 16.

Furthermore, after pressure reduction in unit 20, oxidation unit steam may be mixed with conversion unit steam prior to super heating in the super heater 8. After a pressure drop over unit 21, condensed oxidation unit steam may be combined with condense in line 15.

Figure 2:
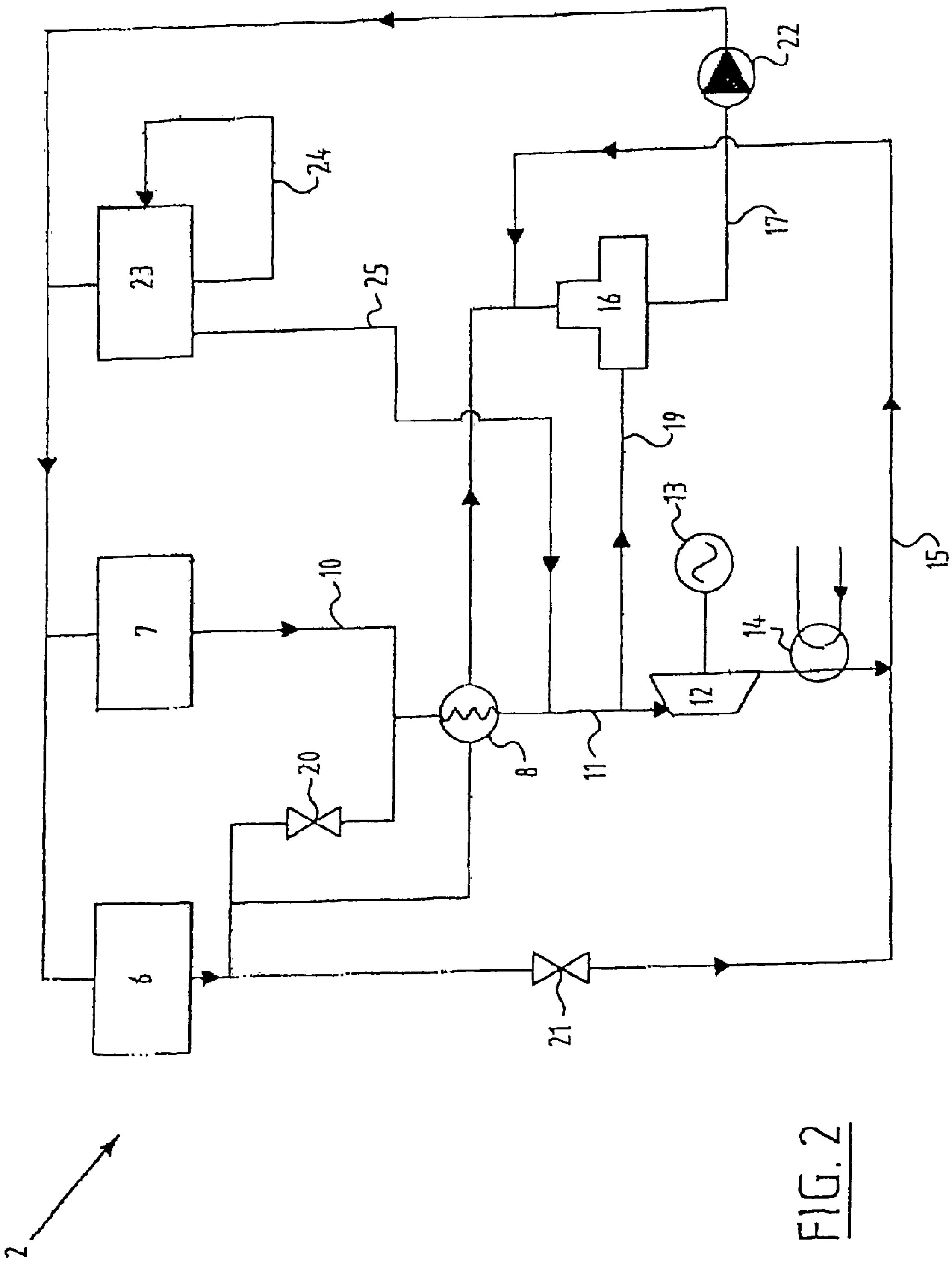

FIG. 2 shows a similar system 2 for generating power. The same features are referenced by using the same reference number. System 2 further comprises a reformed unit 23 with an internal steam cycle 24. Via line 25 super heated steam from the reformed unit 23 (20–40 bar/200–270° C.) is combined with conversion steam super heated in the super heater 8.

Figure 3:
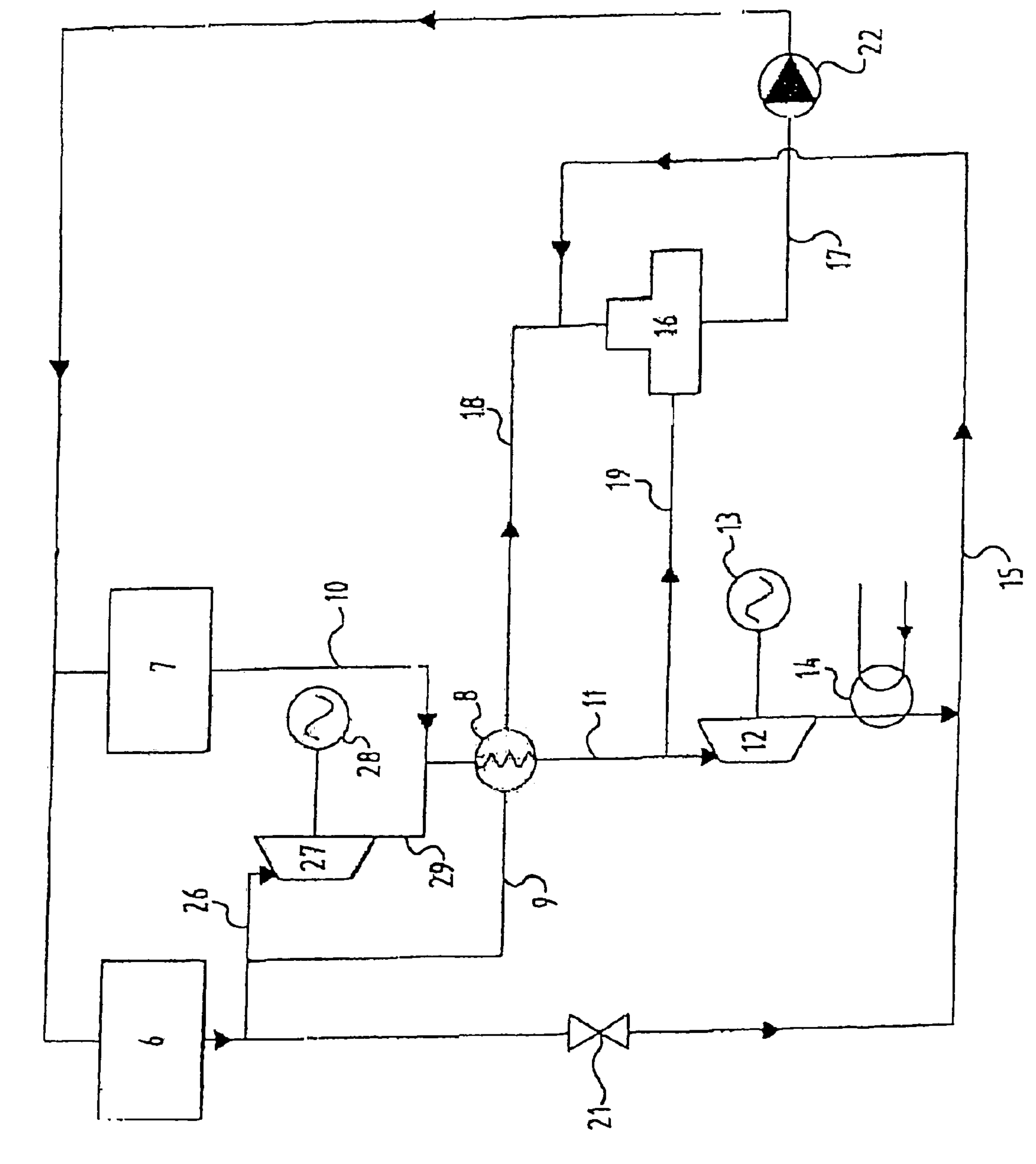

FIG. 3 shows a system 3 according to the invention for power generation. In comparison to system 1 of FIG. 1, part of the oxidation unit steam originating from the oxidation unit 6 is supplied via line 26 to a steam turbine 27 for power generation and/or driving a generator 28. Expanded oxidation unit steam is supplied via line 29 to the super heater 8.

Figure 4:
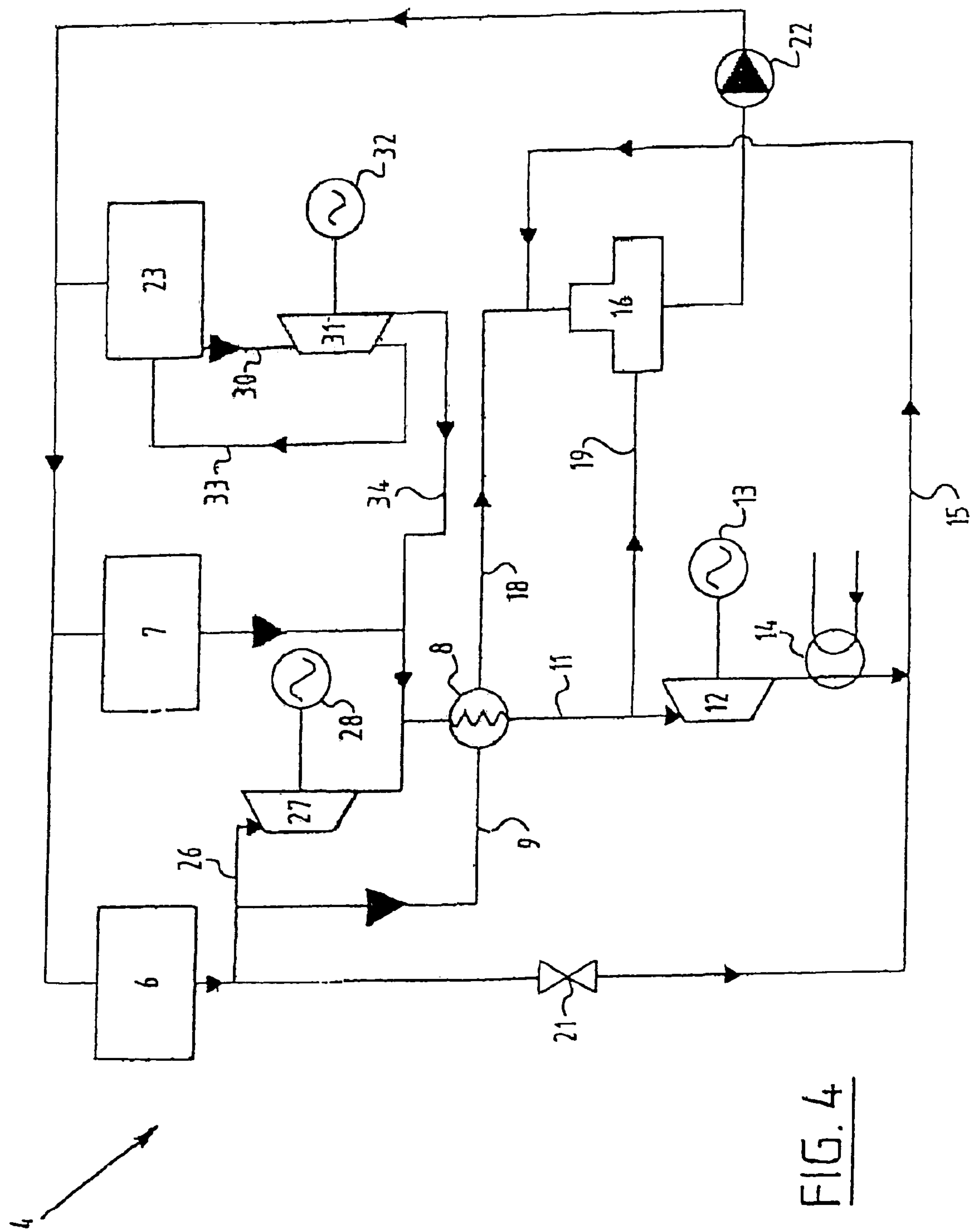

FIG. 4 shows a system 4 according to the invention for power generation. In comparison to system 3 of FIG. 3, system 4 is provided with a reformed unit 23. Super heated reformer steam (40–70 bar/400–500° C.) is provided via line 30 to a steam turbine 31 which may drive a generator 32, partly expanded reformer steam is recycled via line 33. Expanded reformer steam is transported via line 34 to the super heater 8.

Figure 5:
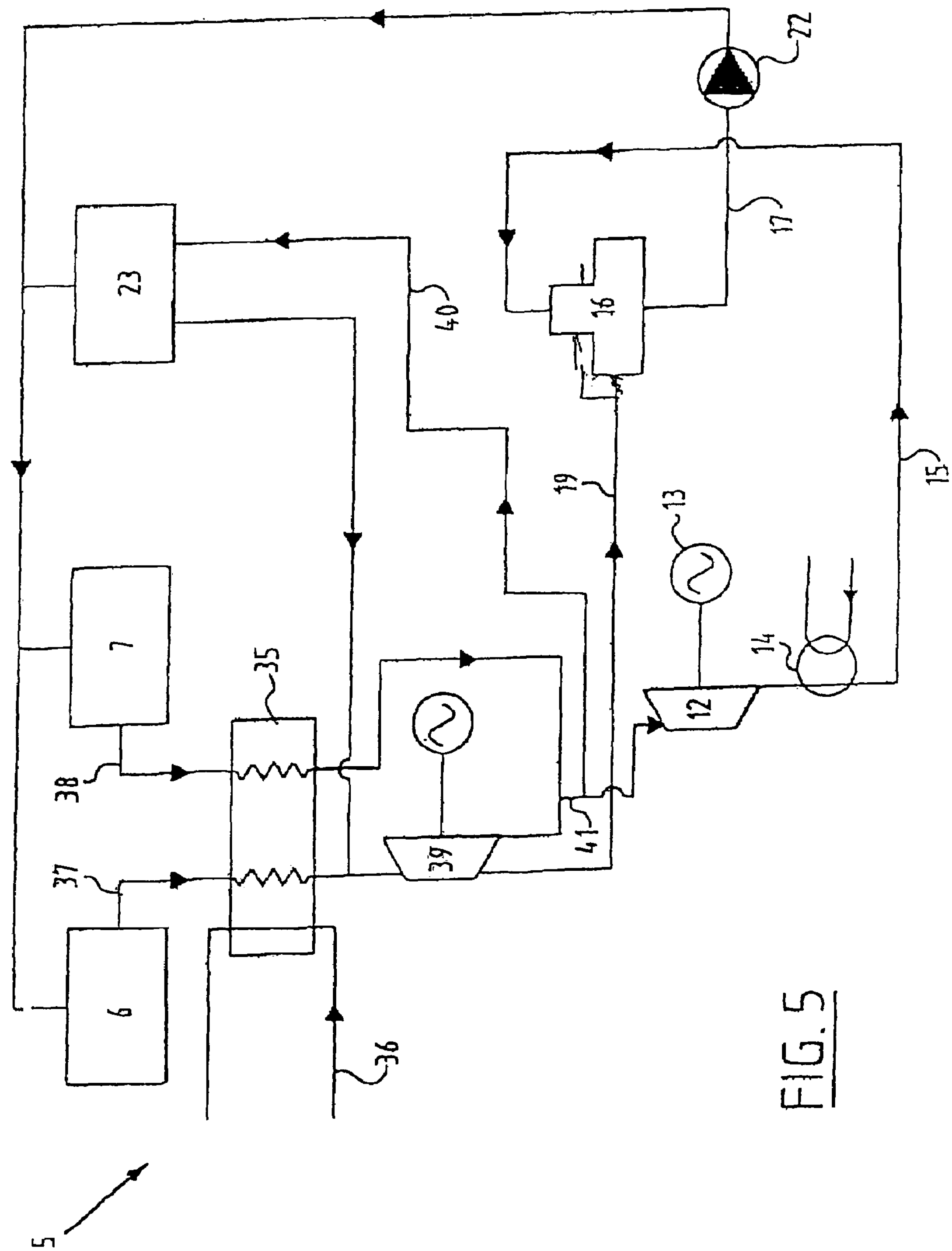

Finally, FIG. 5 shows system 5 according to the invention for power generation. System 5 comprises a super heater 35 which uses flue gas supplied via line 36 and originating from the reformed unit 23. In the super heater 35 is super heated saturated oxidation unit steam supplied via line 37 from the oxidation unit 6, and saturated conversion unit steam supplied via line 38 from the conversion unit 7.

Super heated oxidation unit steam is used for driving a steam turbine 39. Partly expanded super heated oxidation unit steam is supplied via line 19 to the degasser 16 and via line 40 to the reformer unit 23. Super heated conversion unit steam is mixed with more expanded oxidation unit steam and supplied via line 41 to the steam turbine 12.

We claim:

1. A system for power generation in a process for producing hydrocarbons by catalytic conversion of synthesis gas, comprising:

i. an oxidation unit for producing synthesis gas and oxidation unit steam by partial oxidation of a hydrocarbonaceous feed and oxygen comprising gas;

ii. a conversion unit for producing said hydrocarbons and conversion unit steam by catalytical conversion of said synthesis gas; and, iii. means for super heating conversion unit steam and a unit for power generation using the super heated steam.

2. The system of claim 1, wherein the means for super heating comprise a super heater unit, which is super heated with flue gas.

3. The system of claim 2, wherein the flue gas originates from a reformer unit reforming hydro-carbonaceous feed into synthesis gas.

4. The system of claim 2, wherein the flue gas originates from a furnace.

5. The system of claim 1, wherein the super heating means comprise a super heater unit which is super heated with oxidation unit steam.

6. The system of claim 1, comprising a unit for power generation using oxidation unit steam.

7. The system of claim 6, wherein the oxidation unit steam used for power generation is super heated using reformer unit flue gas.

8. The system of claim 6, wherein the oxidation unit steam used for power generation is super heated using the super heating means for super heating conversion unit steam.

9. The system of claim 1, comprising a unit for power generation using reformer unit steam.

10. The system of claim 9, wherein the reformer unit steam used for power generation is super heated using the steam super heating means for super heating conversion unit steam.

11. The system of claim 3, wherein the flue gas originates from a furnace.

12. The system of claim 2, wherein the super heating means comprise a super heater unit which is super heated with oxidation unit steam.

13. The system of claim 3, wherein the super heating means comprise a super heater unit which is super heated with oxidation unit steam.

14. The system of claim 4, wherein the super heating means comprise a super heater unit which is super heated with oxidation unit steam.

15. The system of claim 2, comprising a unit for power generation using oxidation unit steam.

16. The system of claim 3, comprising a unit for power generation using oxidation unit steam.

17. The system of claim 4, comprising a unit for power generation using oxidation unit steam.

18. The system of claim 5, comprising a unit for power generation using oxidation unit steam.

19. The system of claim 7, wherein the oxidation unit steam used for power generation is super heated using the super heating means for super heating conversion unit steam.

20. The system of claim 2, comprising a unit for power generation using reformer unit steam.

21. The system of claim 3, comprising a unit for power generation using reformer unit steam.

22. The system of claim 4, comprising a unit for power generation using reformer unit steam.

23. The system of claim 5, comprising a unit for power generation using reformer unit steam.

24. The system of claim 6, comprising a unit for power generation using reformer unit steam.

25. The system of claim 7, comprising a unit for power generation using reformer unit steam.

26. The system of claim 8, comprising a unit for power generation using reformer unit steam.

* * * * *